Sept. 12, 1967 H. L. HAGLER 3,340,931
TURNING PROCESS AND APPARATUS
Filed June 24, 1965 2 Sheets-Sheet 1
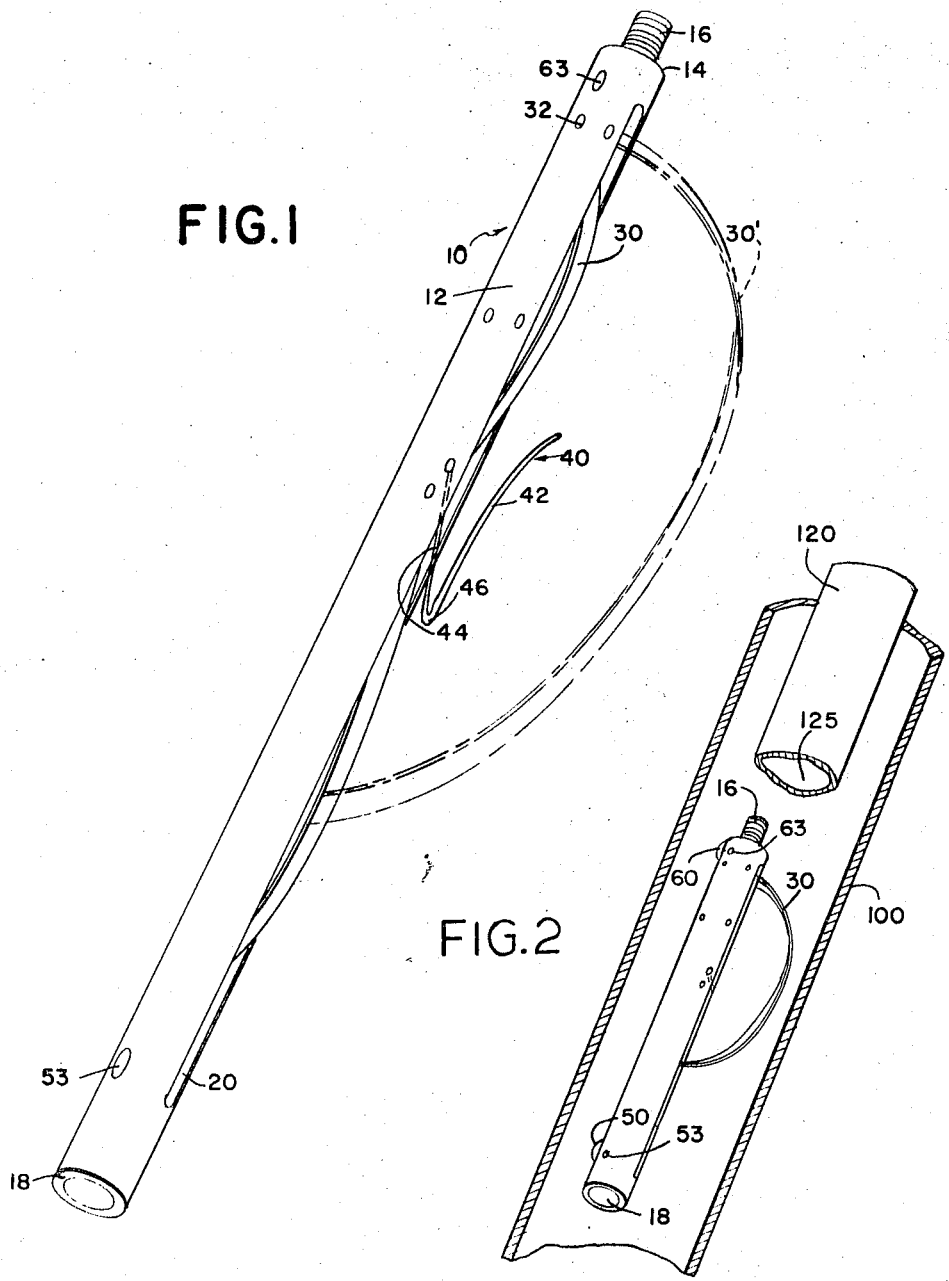
INVENTOR
HERBERT L. HAGLER
Semmes & Semmes
ATTORNEYS

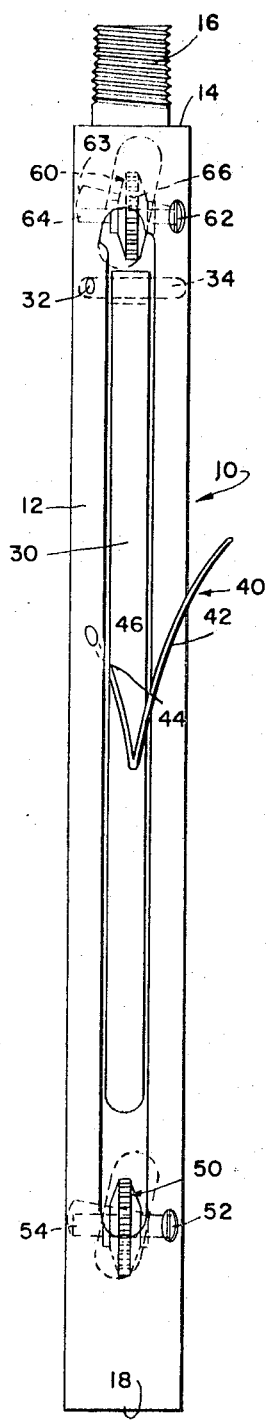
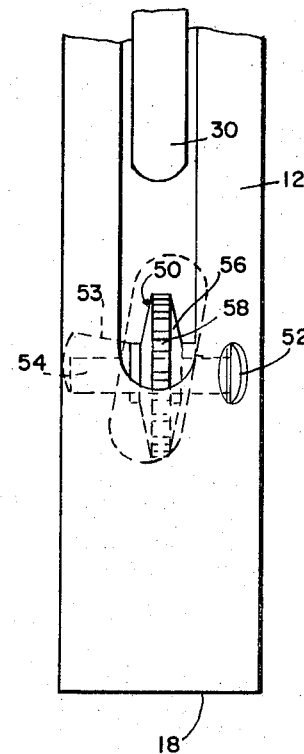
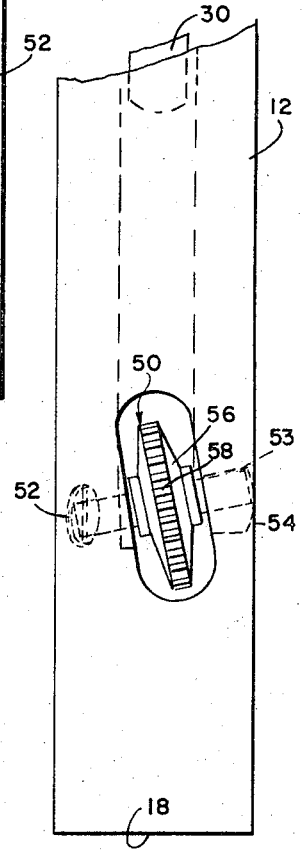
INVENTOR
HERBERT L. HAGLER
Semmes & Semmes
ATTORNEYS United States Patent Office 3,340,931
Patented Sept. 12, 1967

3,340,931
TURNING PROCESS AND APPARATUS
Herbert L. Hagler, P.O. Box 4456,
Midland, Tex. 79701
Filed June 24, 1965, Ser. No. 466,799
4 Claims. (Cl. 166—46)

This application concerns a turning device for positioning an apparatus. The device disclosed herein has particular application in rotating a grapple or fishing tool around a remote interior of a well casing.

In the process of testing or working on oil, gas, salt, other minerals or water wells, instruments or tools are often dropped to the bottom of a well. In attempting to recover dropped instruments or tools, it is quite difficult to position a grapple or a recovery socket over an instrument or tool. Often a neck or fishing neck of a dropped implement lies against an interior wall of a well casing. Grapples passed vertically downward into the well have been incapable of reaching, grasping or locking on tools so difficultly positioned.

Most wells which are drilled for production or injection of oil, gas, salt, other minerals or water, are completed with casings having four, four and one-half, five or seven inch diameters. To produce fluid from a well bore or to inject fluid into a formation, one, one and one-half, two inch or two and one-half inch diameter tubing is run inside the casing. The bottom of the tubing may be set anywhere from a few feet to several hundred feet above the bottom of a well. Tubing sometimes is run without any closure or restriction inside, which leaves the tubing open from top to bottom.

Instruments or tools used within a well itself are usually small enough in diameter to allow them to be run in the two inch or two and one-half inch tubing. The most common tool or instrument is one and one quarter inch in diameter, with a seven-eighths inch fishing neck extending from its top. After a tool, or an instrument has been dropped, a fishing tool, socket or grapple is run down a well in order to grasp the fishing neck on the tool or instrument.

Because tools or instruments are often longer in dimension than the diameter of the outer well casing, tools which are dropped into the well often are slanted and lean with their tops against the walls of the casing. Conventional grapples operate least successfully adjacent the walls of the casing. Consequently, great difficulty has been encountered in picking up these tools.

The present invention is intended to assist in positioning a grapple or recovery socket adjacent the walls of a casing. Elements of the invention cooperate in spiraling a recovery tool downwardly along the interior of a casing where it may contact the neck of a lost instrument.

Accordingly, it is an object of this invention to provide a turning device.

Presenting an automatic turning device is a second object of this invention.

Another object of this invention is the provision of a spiraling device for use inside a cylinder.

This invention has as a further objective the introduction of a novel process for recovering articles from elongated hollow shafts.

A further objective of this invention is the positioning and rotating recovery tool, sockets or grapples along the interior perimeter of a well casing.

Further objectives of the invention will be apparent from the drawings in which:

FIGURE 1 is a perspective view of one side of a rotating device, showing a leaf spring in compressed and extended positions;

FIGURE 2 is a cut-away view of a well casing, into which the rotating tool has been lowered through a central tubing;

FIGURE 3 is an elevation of the rotating tool;

FIGURE 4 is a detail of the lower end of the tool, showing the lower wheel in a position automatically assumed when the tool is raised;

FIGURE 5 is a detail of the reverse side of the tool shown in FIGURE 4, showing the wheel in a position automatically assumed when the device is lowered.

A rotating tool is generally indicated by the numeral 10 in FIGURE 1. Elongated body 12 has an upper end 14, supporting a threaded extension 16, which may receive a common swivel (not shown). Lower end 18 of tool 10 is configured to receive a common recovery socket or fishing tool. The function of the present apparatus is the positioning of the recovery tool rather than the recovery of items, per se.

Body 12 comprises a cylinder; elongated slot 20 in the cylinder receives compressed leaf spring 30. Spring 30 is fixed to body 12 only at one point by a pin through hole 32. Wire detent 40 has an upward and outward extending portion 42 for engaging lower edge 125 of tubing 120 (FIGURE 2). Upward and inward extending portion 44 of wire detent 40 fits in a hole angularly drilled in the cylindrical wall of body 12. Apex 46 of the wire points downwardly. After the turning device has passed downward through tubing 120 and exits from bottom 125, turning device 10 is lifted so that wire 40 catches on the bottom of tubing 120. Continued lifting pulls the wire from body 12, and flat spring 30 is released to its normally bowed position, shown in phantom lines as 30' in FIGURE 1.

In FIGURE 2, when spring 30 is deployed by releasing the wire detent 40, body 12 is forced against an opposite portion of the casing wall 100, and rollers 50 and 60 engage the casing.

FIGURE 3 is an elevation showing the relationship of the spring 30, wire detent 40 and turning elements, generally indicated by numerals 50 and 60. A single pin 34 mounted in hole 32 in body 12 holds spring 30. A portion of wire 40 overlies a medial portion of spring 30, holding the spring compressed within body 12. Wheels 50 and 60 are mounted adjacent opposite ends of the body and extend from the rear of the body opposite spring receiving opening 20, as best shown in FIGURE 2. Hole 52 in the cylindrical wall of the body pivotably receives a first end of shaft 54 upon which wheel 56 is mounted. In a like manner, opening 62 pivotably receives a first end of shaft 64, which mounts wheel 66. Enlarged openings 53 and 63, opposite holes 52 and 62 allow respective second ends of the wheel shafts to move freely within limits.

FIGURE 4 is a detail of the bottom wheel mounting shown in FIGURE 3. 52 represents a hole in the cylindrical wall of body 12. 54 shown in phantom lines is the shaft upon which wheel 56 rotates. Numeral 58 defines teeth at the periphery of the wheel, which ensure rolling contact with well casing 100, shown in FIGURE 2. Freely moving shaft 54 is shown in its normal position, assumed when the device is raised.

FIGURE 5 is a detail of the reverse of FIGURE 4, showing the wheel system 50 in its operable position for causing rotation. Shaft 54 has rotated to the uppermost limit of opening 53, causing wheel 56 to be oriented at an angle to body 12. Teeth 58 engage the inner wall of the casing. Consequently, after leaf spring 30 has deployed, pressing the device against an opposite portion of the interior wall of the casing 100, angularly oriented parallel wheel systems 50 and 60 engage casing wall 100, causing the tool to spiral downwardly.

Operation

After a tool or instrument has been dropped into a well, rotating device 10 is made ready to run into the hole by attaching a set of jars and a stem or weight bar to top 14 of rotating tool 10 by means of a swivel. A suitable recovery socket, "over shot," or fishing tool is attached to lower end 18 of rotating tool 10. The string of tools is then run into the well to a point below the inner tubing. The tool string is then picked up until wire 40 engages the lower end of the tubing. Further raising of the tool string pulls wire 40 from the rotating tool, releasing bow spring 30. Spring 30 pushes the rotating tool against the opposite wall. As tool 10 continues downward, shafts 54 and 64 rotate within their mountings, causing wheel systems 50 and 60 to turn approximately 8 degrees from a course parallel to an axis of casing 100.

The string of tools is run down the interior of the lower portion of the casing along a helical path, which is caused by the inclined wheels. When the rotating tool is lifted, wheels align with the tool, allowing the tool to be lifted in a straight line.

Assuming that a lost tool or instrument is slanted with its top leaning against the interior wall of a well casing, the string of recovery tools, including the rotating tool, is lowered to the bottom of the well. The string of tools is picked up until the socket or fishing tool is estimated to be level with the top of the lost instrument. The string is stroked slowly up and down. Turning wheels move the string circumferentially along the interior of the casing until the lost instrument is reached. The socket then goes down over the fishing neck of the instrument so that it may be removed from the well.

Although this invention has been disclosed by specific example, it will be obvious to one skilled in the art that the principles taught herein have several applications. Consequently, the precise scope of the invention is defined only in the appended claims.

I claim:
1. A turning device comprising:
   (A) an elongated body having first and second ends;
   (B) first and second shafts mounted venerally transversely in said body, said shafts having first portions pivoted in said body and second portions controllably movable in said body;
   (C) wheels mounted on each said first and second shaft, said wheels having at least portions thereof extending from said body;
   (D) a spring having at least one end thereof fixed to said body;
   (E) detent means mounted in said body, a portion of said detent means extending over a portion of said spring, holding said spring compressed against said body, said detent means being operable to release said spring.
2. The device of claim 1 wherein said spring extends from said body in a direction opposite the portions of said wheels extending from said body.
3. In a deep well fishing tool, a rotating device comprising:
an elongated cylinder having first and second longitudinal ends, said first end adapted to receive a swivel, said second end adapted to receive a grapple;
a pin mounted transversely adjacent said first end;
a normally bowed leaf spring having one end fixed to said pin;
an elongated opening in said cylinder, receiving said leaf spring compressed;
a V-shaped wire detent means, having an apex pointing toward said second end, having a first terminus removably mounted in medial hole in said cylinder, said wire detent having a second terminus extending outwardly from said cylinder and toward said first end, at least a portion of said wire detent overlying said at least a portion of said spring;
first and second shafts respectively having first and second ends, said first ends of said shafts pivoted in said cylinder, respectively adjacent first and second ends of said cylinder, said second ends of said shafts limitedly moving within elongated holes in said cylinder wall;
first and second wheels respectively mounted on said first and second shafts, said wheels having portions thereof extending from said cylinder opposite said spring.
4. A process for positioning recovery apparatus adjacent an object in a bottom of a well comprising:
lowering recovery apparatus in a well;
forcing said apparatus against a wall of said well;
aligning guides on said apparatus, said guides contacting the well wall angularly to an axis of said well so as to impart helical movement of said apparatus with respect to the wall of said well;
continuing lowering said apparatus to a bottom of said well;
aligning guides on said apparatus longitudinally with respect to said well so as to impart longitudinal movement of said apparatus, aligned parallel to the well wall;
raising said apparatus a relatively short distance;
lowering said apparatus, and aligning said guides angularly with respect to said well, thereby intermittently raising said apparatus on a straight path and lowering said apparatus on an helical path.

References Cited

UNITED STATES PATENTS

| | | | |
|---|---|---|---|
| 1,918,663 | 7/1933 | Phillips | 166—117.7 |
| 2,124,302 | 7/1938 | Lohr et al. | 46—211 |
| 2,251,125 | 7/1941 | Gardner | 166—215 |
| 2,546,632 | 3/1951 | Dill | 175—75 |
| 2,568,005 | 9/1951 | Holder et al. | 166—215 |
| 2,781,891 | 2/1957 | Bloom | 214—339 |
| 2,947,521 | 8/1960 | Tapp Meyer | 166—117.7 |

CHARLES E. O'CONNELL, *Primary Examiner.*

JAMES A. LEPPINK, *Examiner.*